United States Patent [19]

Hill

[11] Patent Number: 4,590,643

[45] Date of Patent: May 27, 1986

[54] HIGH YIELD GIZZARD HARVESTING APPARATUS

[76] Inventor: William J. Hill, P.O. Box 230, Ball Ground, Ga. 30107

[21] Appl. No.: 461,271

[22] Filed: Jan. 26, 1983

[51] Int. Cl.[4] ............................................. A22C 21/00
[52] U.S. Cl. ....................................... 17/11; 198/415; 198/626
[58] Field of Search .................. 198/415, 626; 17/11, 17/61, 56, 48; 83/435, 435.2, 409.1, 424, 420, 422, 879, 886

[56] References Cited

U.S. PATENT DOCUMENTS

| | | | |
|---|---|---|---|
| 1,552,463 | 9/1925 | Barry | 17/56 |
| 3,076,998 | 2/1963 | Harben, Jr. et al. | 17/11 |
| 3,119,144 | 1/1964 | Hill | 17/11 |
| 3,159,872 | 12/1964 | Hill | 17/45 |
| 3,164,859 | 1/1965 | Ambos et al. | 17/48 |
| 3,172,148 | 3/1965 | Hill | 17/11 |
| 3,273,692 | 9/1966 | Petersen et al. | 198/415 X |
| 3,406,425 | 10/1968 | Hill | 17/11 |
| 3,454,142 | 7/1969 | Holstein | 198/626 |
| 3,990,128 | 11/1976 | Van Mil | 17/43 |
| 4,057,875 | 11/1977 | Hill | 17/11 X |
| 4,073,040 | 2/1978 | Hill | 17/11 X |
| 4,203,178 | 5/1980 | Hazenbroek | 17/50 |
| 4,249,284 | 2/1981 | Graham et al. | 17/52 |
| 4,302,867 | 12/1981 | Hill | 17/11 |

Primary Examiner—Willie G. Abercrombie
Attorney, Agent, or Firm—Willian Brinks Olds Hofer Gilson & Lione Ltd.

[57] ABSTRACT

A method and apparatus for processing poultry gizzards employing in-feed rollers and retarding means to initially orient the gizzards with appendage organs dangling below. The appendage organs are severed whereupon the gizzards are secured in the initial positions, transported and reoriented to a new position before being slit by a cutting blade. The slit gizzards are spread apart and transferred while being secured in a predefined position to a shearer-peeler station having a pair of primary rollers with a shearing and a peeling section, and then to a pair of slower rotating rollers also with a shearer and a peeler section. A vibrating tamper compresses the gizzards on the secondary peeler section for a final thorough cleaning of the gizzards.

19 Claims, 10 Drawing Figures

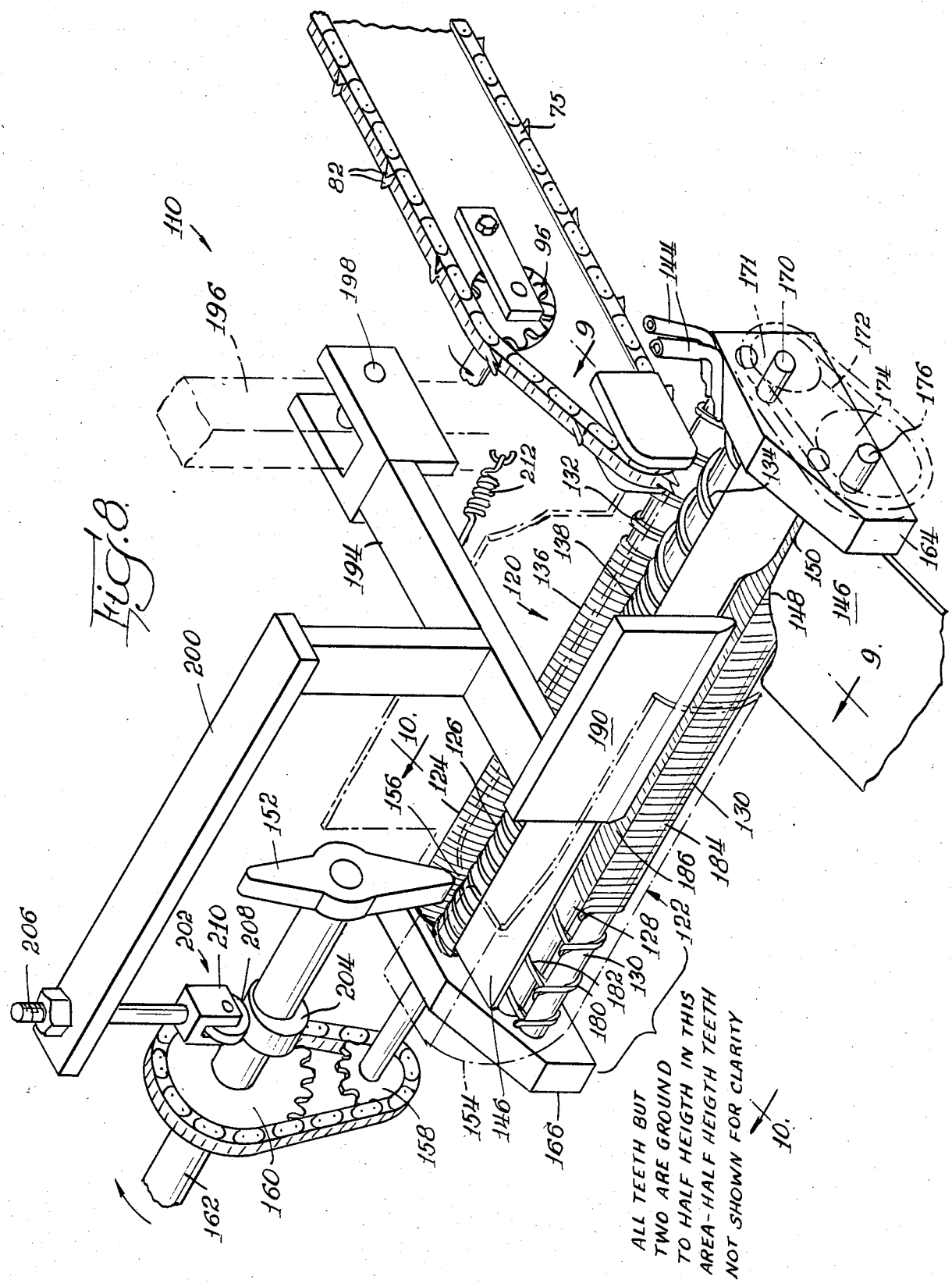

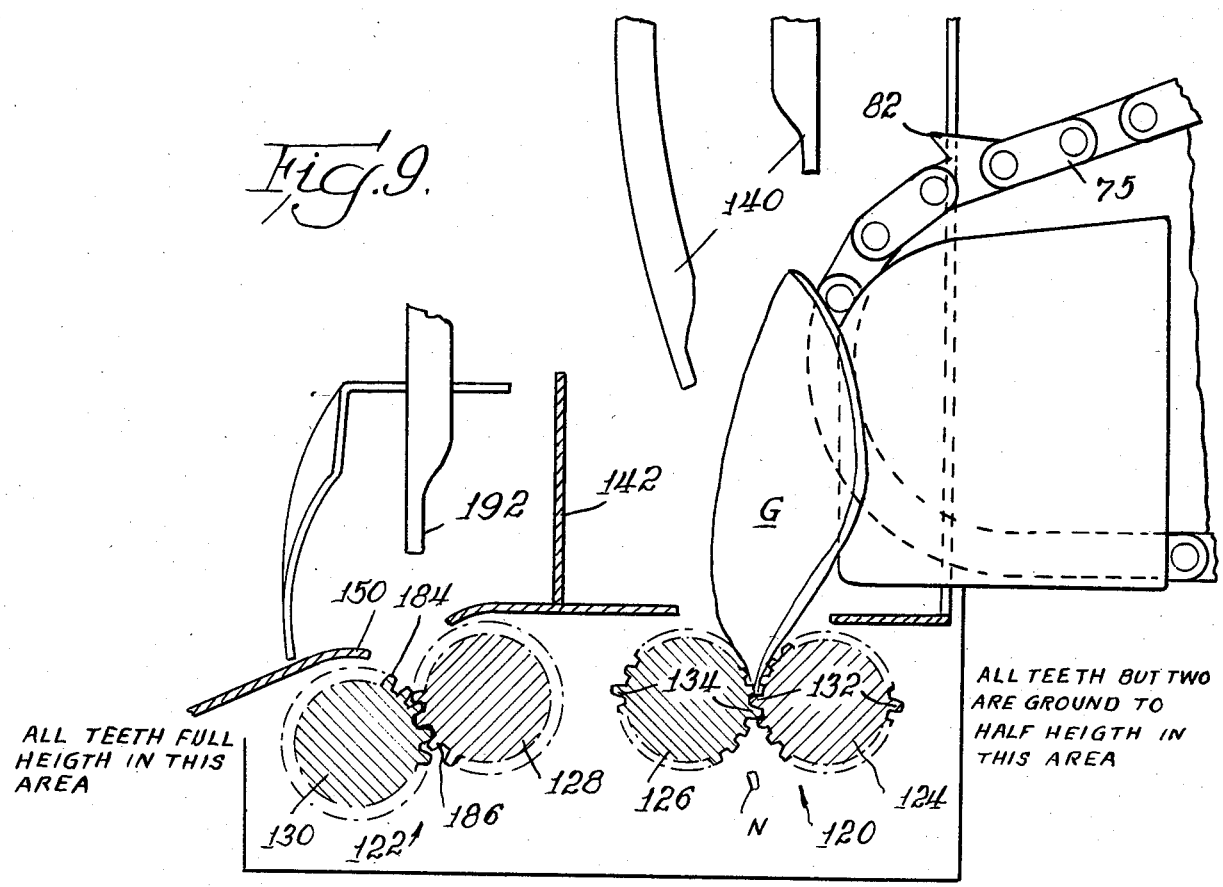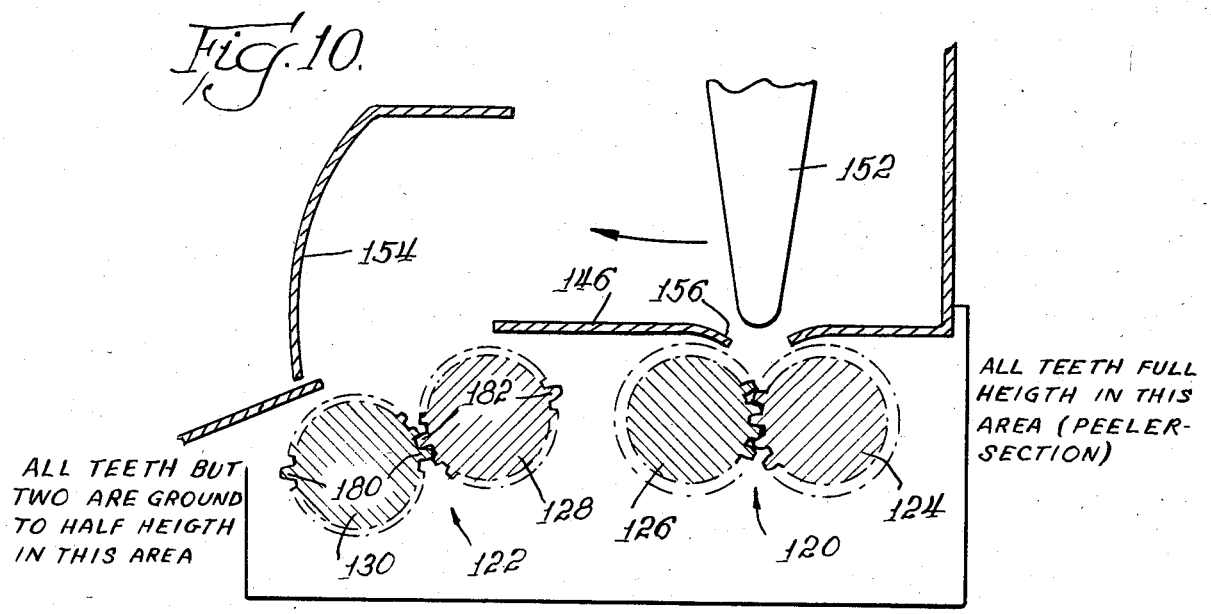

HIGH YIELD GIZZARD HARVESTING APPARATUS

BACKGROUND AND GENERAL DESCRIPTION

This invention relates to an improved method and apparatus for processing poultry gizzards, and more particularly relates to an improved gizzard harvester and method of operation therefor which automatically processes poultry gizzards on a high speed, mass production basis.

The processing of poultry gizzards into condition for use and consumption requires that the gizzards be opened and cleaned; the contaminating contents removed; the stomach and gut or intestines trimmed off the gizzard; and the interior lining or membrane skinned off and discarded. These steps are necessary because the processed gizzards must pass rigorous quality and hygiene standards imposed by the industry and by governmental agencies and regulations. If any of the above treatments are not thoroughly and properly completed, the resulting product may be of low quality, or may be contaminated so as to fail inspection. There is thus a constant search for improvements in the method and apparatus for processing gizzards which would meet rigorous quality and hygiene standards applicable in this field.

Other requirements for harvesting gizzards are that the activity must be conducted efficiently and economically on a high-speed, mass production basis, with a minimum of hand labor. The high speeds are necessary so that the harvester apparatus and process handles gizzards at a speed which is compatible with the increasingly higher line speeds utilized in modern poultry processing plants. For example, poultry processing plant line speeds have increased in recent times from approximately 50 units per minute to 70 to 75 units per minute. The expectation is that line speeds will be raised even higher in the future, because of the pressures of economics and the need for increased efficiency.

Competitive commercial and economic considerations dictate that in increasing the speed of the machine, the yield of the product should not be compromised. For after all, no overall advantage is gained if the processed quantity increases, but a higher percentage of it is unacceptable. However, processing plants readily recognize that, despite the sizeable capital investments involved, a machine capable of increased speed and product yield possesses a large competitive edge over low cost machines with medium speed or yield.

To perform these gizzard processing functions at high-speed and high yield levels, the functions of the machine and process must be integrated for a smooth and continuous operation, and the utilization of hand labor must be minimized. Moreover, whatever manual labor that is needed should be unskilled labor. In addition, the processing apparatus should be compact in design to operate in a minimum space within a poultry processing plant. Likewise, all of the needed processing steps should be performed with a minimum number of machines. The process and apparatus should also minimize the gizzard rejects due to improper or inadequate processing, and thereby increase the yield from the operation.

Prior gizzard harvesters and processes which have attempted to meet the foregoing criteria, have met with varying degrees of success. The present invention meets these criteria by providing an improved apparatus and process which handles poultry gizzards on a mass production basis with a minimum of unskilled hand labor, and with a compact design which permits the processing to be accomplished at substantially high line speeds and yields. For example, the present invention minimizes hand labor requirements by providing an apparatus and process which operates on gizzards having attached stomachs and intestines. Thus, the hand labor needed to cut off the stomach and/or the intestines from the gizzard with other machines has been eliminated.

In addition, the invention eliminates the criticality of the condition in which the gizzards are introduced into the harvester. In accordance with this invention, the gizzards having the stomach and intestines attached can be pulled from the poultry by unskilled labor, and the gizzard and the attached portions can be randomly fed into the harvesting machine. The processing operation is thereby initiated without the need to be concerned with the initial orientation of the gizzards. Rather, the randomly fed gizzards will be arranged automatically into the desired predetermined orientation by the operation of the harvester.

Many of the features and advantages of the present invention accrue because complete and accurate control of the gizzards is established and maintained at all stages of the operation. At the initial stages of operation of the harvester, the control of the gizzards is accomplished by utilizing the stomach and intestines attached to the gizzards. Once such initial control of the gizzards is obtained, and the gizzards are oriented into a desired position, the attached stomach and intestines are removed, and the gizzards are controlled by other means throughout the remaining operations of the harvester. The subsequent operations function to completely open and clean the gizzard; to trim the tender lining from each gizzard which remains after the stomach and intestines have been sheared; and to peel the interior membrane or lining from each gizzard.

Yield is optimized when the gizzard is properly manipulated into an orientation which permits the processing operation to cut, slit and clean that part of the gizzard which is presented to the mechanics of the machine. For instance, while a gizzard may be slit along one of many axes to remove the waste, one cut along the short axis of the gizzard body permits it to be opened for exposing the maximum lining area for cleaning purposes, as well as to permit easy removal of the lining. Also, a lengthwise slit which leaves the attached nib of the gut disposed at the front of the oriented gizzard facilitates a reliable removal of the nib as it proceeds to the nib removing station. A mishap in any one of these operations results in decreased yield and, if the misprocessed gizzard can be salvaged, additional manual labor would be necessary.

Briefly described, the advantages and features of the present invention are provided by a poultry gizzard harvesting apparatus which is adapted to process composite gizzards having portions including the stomach and the intestines attached. The use of expensive hand labor is minimized because the gizzards can be removed directly from the poultry and dropped into the machine in a random arrangement. The hand trimming of stomachs and/or intestines, and the attendant costs and problems, are thereby eliminated. The harvester receives a plurality of composite gizzards and feeds them into a feeding and aligning station. This feeding and aligning station includes in-feed roller means for engaging the stomach and the intestines to apply an initial spatial orienting force to each gizzard. The in-feed roller means acts upon each composite gizzard and stomach to position it in this initial spatial orientation, and also transports the composite gizzard laterally along a predetermined path through the harvester, while maintaining control over the orientation of the gizzard.

After the randomly-fed gizzards are spatially oriented by the infeed roller means, the gizzards are acted upon by retarding and separator means adjacent the in-feed roller means. The retarding means is adapted to impede the movement of each gizzard to the extent necessary to advance the composite gizzards in a spaced apart seriatim fashion while the in-feed roller means maintains the first orienting force applied through the stomach and intestines. In accordance with this invention, the first orienting force applied by the in-feed roller means, and the second orienting force applied by the retarding means, cooperate to arrange each gizzard into a predefined spaced arrangement for further processing.

The harvester pursuant to this invention also includes means for securing the body of each gizzard in this predefined spaced position while the gizzards are conveyed along the processing path within the harvester. Once the gizzards are so secured, a shearing station provided in the processing path functions to simultaneously remove the attached stomach and intestines from each gizzard. The removal of the stomach and intestines occurs automatically after the gizzard is secured by the securing means in the predefined position. The shearing station removes the stomach and intestines by shearing closely to the body of the gizzard to minimize the residual tender lining or nib of the stomach and intestines remaining on the gizzard. At this point, orientation control over the gizzard by the in-feed roller means is lost, but control is maintained on the gizzard body by the securing means, and transported downstream by such means toward the next processing station.

While so secured, a third orientation and transport means rotates the gizzard so that it can be presented to a slitting means thereby assuring that the gizzard will be opened widthwise along its body, and assuring that the gizzard will be transported nib forward. Orientation control of the gizzard body by the securing means terminates at the slitting station, whereupon control is had by another transport means which directs the slit gizzards to a spreader means positioned adjacent the path of travel. Here, the slit gizzard is opened to expose the interior lining or membrane and the contents of the gizzard. Flushing means then flush out the interior of the opened gizzard to remove the contaminants.

Thereafter, the gizzard is transported nib-forward toward a primary shearing means engagable with the fore edge of each gizzard to remove the residual tender lining or nib to which the stomach and intestines had been attached. Such a trimming of the tender lining increases the yield of the machine by eliminating the tender lining as a source of contamination. The harvester provides primary peeler means to engage with and remove the tender lining or nib and peel the interior membrane or lining from each gizzard.

Orientation control of each gizzard, after having been peeled, is no longer necessary and is thereby terminated, whereby each gizzard is then randomly directed to a secondary shearer and peeler station. At this stage of the process there is one last chance to remove residual gizzard nibs with secondary shearing means and residual interior membranes with secondary peeler means. These residual parts may be the result of microprocessing, disfiguration or odd-sized gizzards. Yield is increased and optimized accordingly. The secondary peeler means is effective to remove any remaining residue of inner membranes, and also any fatty tissue normally occurring on the outer surface of the gizzard body. This is accomplished by tamper means which applies a tamping pressure to the gizzards tumbling between the peeler roller means and tamper. The gizzard is then prepared for further processing or consumption.

DESCRIPTION OF AN ILLUSTRATIVE EMBODIMENT

Further objects and features of the present invention will become apparent from the description of the preferred embodiment, taken in conjunction with the accompanying drawings, in which:

FIG. 8 is a fragmentary isometric view of the primary shearing and peeler roller pair, and a secondary shearing and peeler roller pair aided by a tamper plate;

FIG. 9 is an enlarged cross-sectional end view of the primary and secondary shearing and peeler roller pairs, taken along the line 9—9 of FIG. 8, showing a gizzard being gravity deposited nib forward, with the aid of water jet nozzles, from the chain transport 75 onto the primary roller set; and FIG. 10 is an enlarged cross-sectional view of the primary and secondary shearing and peeling roller sets, taken along line 10—10 of FIG. 8, showing the spline configuration of each set.

Figure 1:
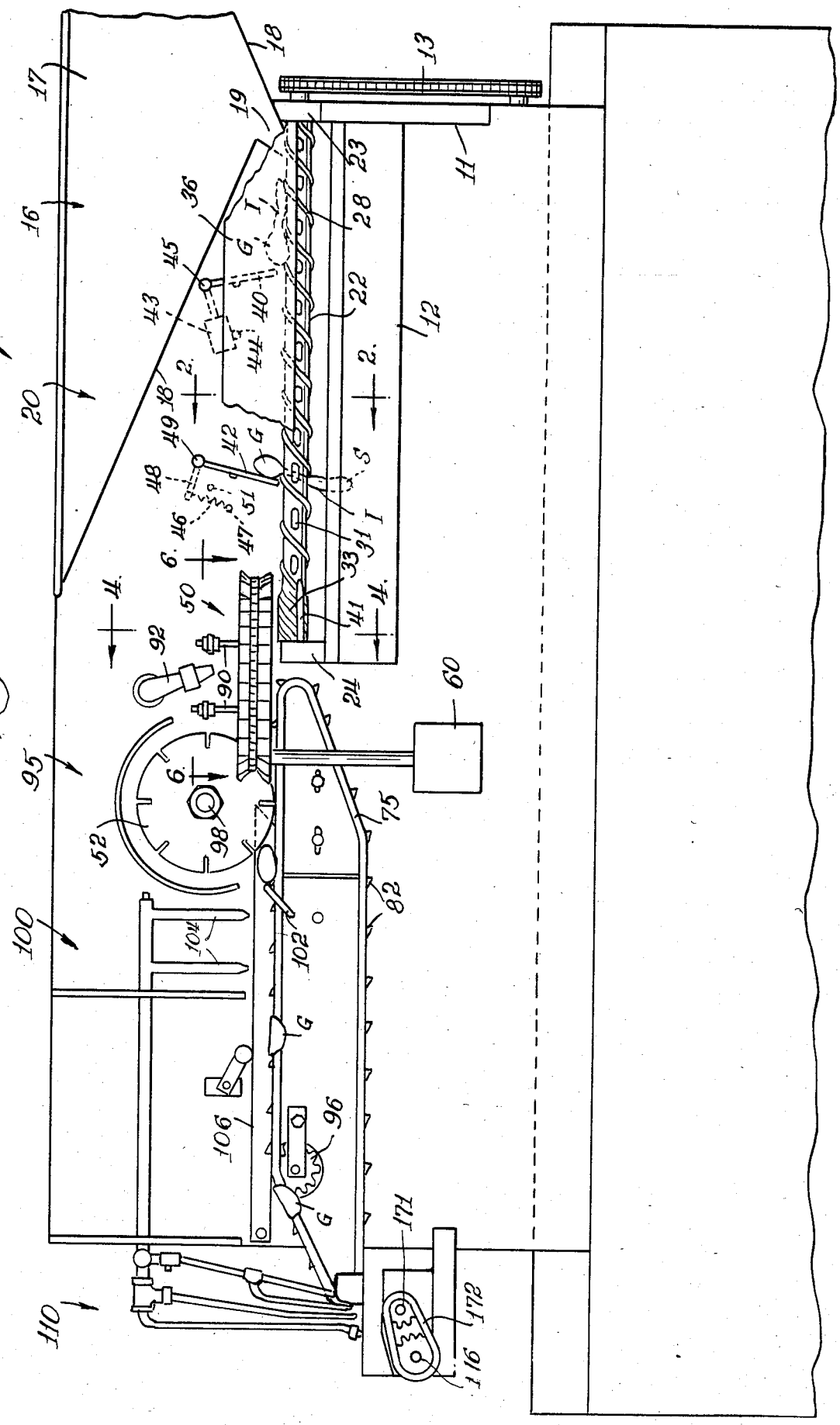
FIG. 1 is a side elevational view of an illustrative embodiment of the gizzard harvester in accordance with the present invention.

Referring generally to the drawings, the gizzard harvester embodying the features and advantages of the present invention is generally identified by the reference numeral 10. As seen in FIG. 1, the harvester 10 includes a frame 11 mounted on suitable legs or a support stand (not shown).

Figure 2:
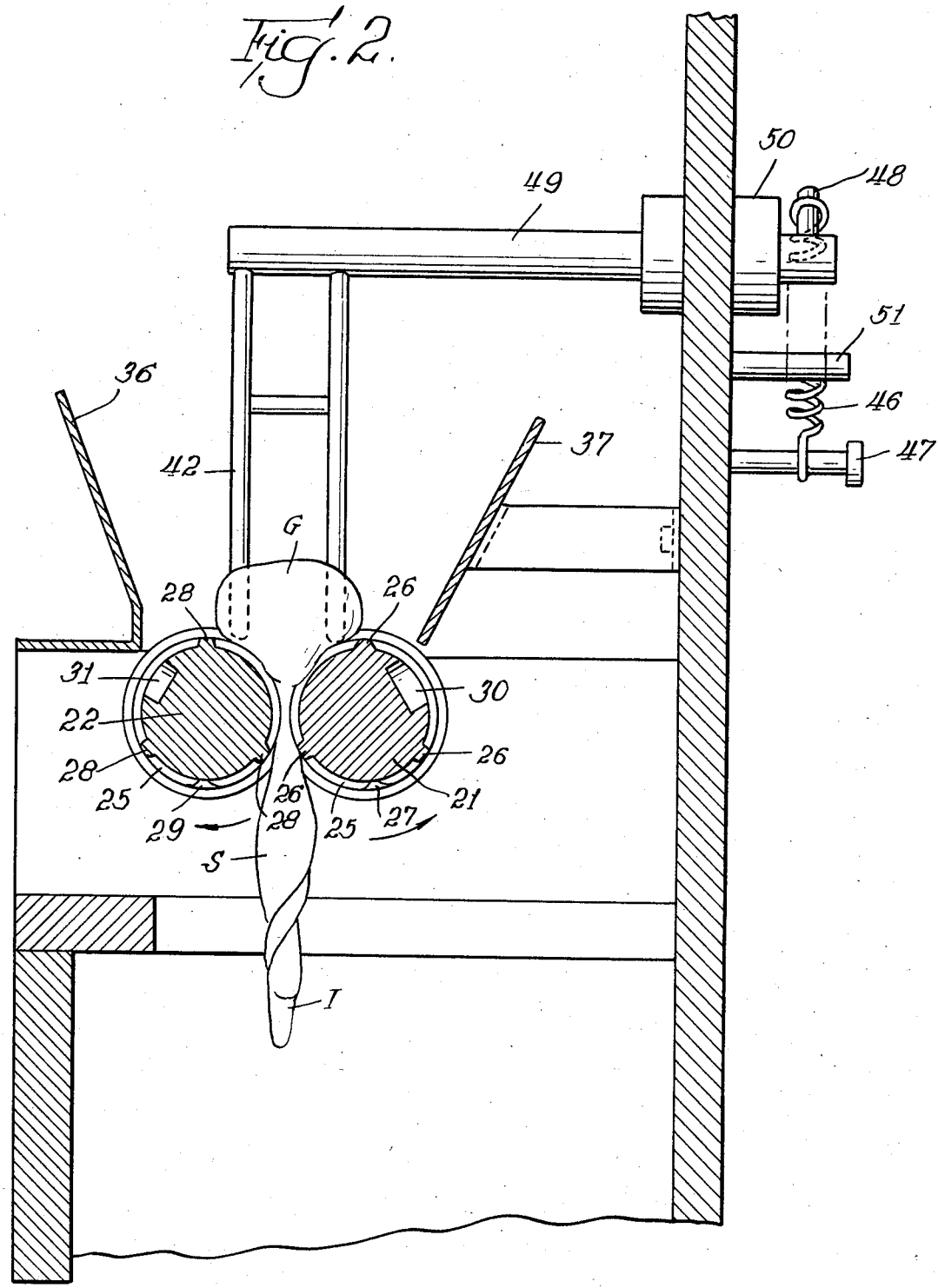
FIG. 2 is an enlarged cross-sectional elevational view of the initial in-feed and aligning section of the harvester, as viewed along line 2—2 of FIG. 1, showing a gizzard having the intestine and stomach attached, and engaged between the in-feed rolls and the retarding arm.

More specifically, there is provided a feeding and aligning station 20 which includes a pair of parallel side-by-side in-feed rollers 21, 22 arranged in a position aligned along the length of processing station 20. In-feed roller 21 (FIG. 2) is the master or drive roller in the illustrated embodiment, and roller 22 is the slave or driven roller. Bearing blocks 23, 24 are journaled to support the in-feed rollers 21, 22 in station 20. A chain drive 13, or other drive means can be connected to an electric or hydraulic motor (not shown), to drive the master roller 21. Mating spiral gears 32 (not shown in FIG. 3) and 33 are provided on the discharge end of the rollers 21 and 22, respectively, to transmit the drive from the in-feed drive roller 21 to the slave roller 22. The rollers 21 and 22 are thereby simultaneously driven at the same speed, and in a counterrotary direction toward each other. As seen in FIG. 2, the rollers 21 and 22 also have gizzard processing splines 26 and 28 which are spaced apart a selected distance to define a space therebetween for receiving the attached portions including the stomachs S and the intestines I which are randomly advancing downstream toward station 20 from the hopper 16.

The counterrotating in-feed rollers 21 and 22 function in accordance with the invention to draw the attached portions including the stomach S and the intestines I of the gizzards G downwardly between the rollers, to thereby apply an initial orienting force to each gizzard through its appendage organs which are drawn downwardly by the in-feed rollers into a position dangling form the gizzard. This initial orienting force moves the gizzards from their random patterns within the hopper 16 to a cradled position which is generally centrally located in the valley between the rollers 21 and 22. The splined rollers 21, 22 also apply a downwardly pulling force to the stomach S and intestines I to urge the gizzards G along a predetermined path aligned with the elongate in-feed rollers in station 20. Splash plates 36 and 37, as shown in FIG. 2, are mounted on the frame 11 adjacent the in-feed rollers 21 and 22, respectively. These plates minimize the splashing on the gizzards G of any contaminated liquid which may be flowing in nearby flush troughs.

To perform these orienting and in-feed functions, in-feed roller 21 is provided with spiral transfer splines 26 which extend substantially throughout the length of the roller. Similarly, the mating in-feed roller 22 includes complementary, and thus oppositely spiraled, transfer splines 28. Additionally, the rollers 21 and 22 are rotatingly timed such that between the rollers the transfer spline crests become adjacent along their length as the rollers counterrotate. As illustrated in FIG. 2, the transfer splines 26, 28 are shown just after they have been adjacently aligned with each other. With this arrangement, the transfer spline crests engage with the stomach S and the intestines I of the gizzard G, as shown in FIG. 2, to pull such stomach and intestines downwardly between the rollers 21, 22. This pulling action orients the gizzard G in an initial central upright position. The axial component of these transfer splines 26, 28 simultaneously apply a component of force to the gizzard G through the connected stomach S and intestines I to move the gizzards downstream. Hence, the in-feed rollers 21, 22 apply an axial force component and a downward force component to each gizzard G to arrange the gizzard in an initial position while transporting the gizzard downstream along station 20.

The preferred form of rollers 21 and 22 also include mating recesses 25 which facilitate the feeding of the stomach S and intestines I of each gizzard G downwardly between the rollers 21 and 22, into the position shown in FIG. 2 of the drawings. In this regard, the spiral transfer splines 26 on the roller 21 are also provided with transversely spaced scallops 27. Similar scallops 29 are provided on the spiral transfer splines 28 of the mating roller 22. As seen in FIGS. 1 and 2, the scallops 27, 29 are spaced uniformly along the associated splines, and are positioned on the rollers 21, 22 so as to be in alignment as the rollers rotate. The mating scallops 27, 29 thereby provide an enlargement of the space between the rollers 21, 22, to facilitate the feeding of the poultry stomach S and intestines I therebetween.

Figure 3:
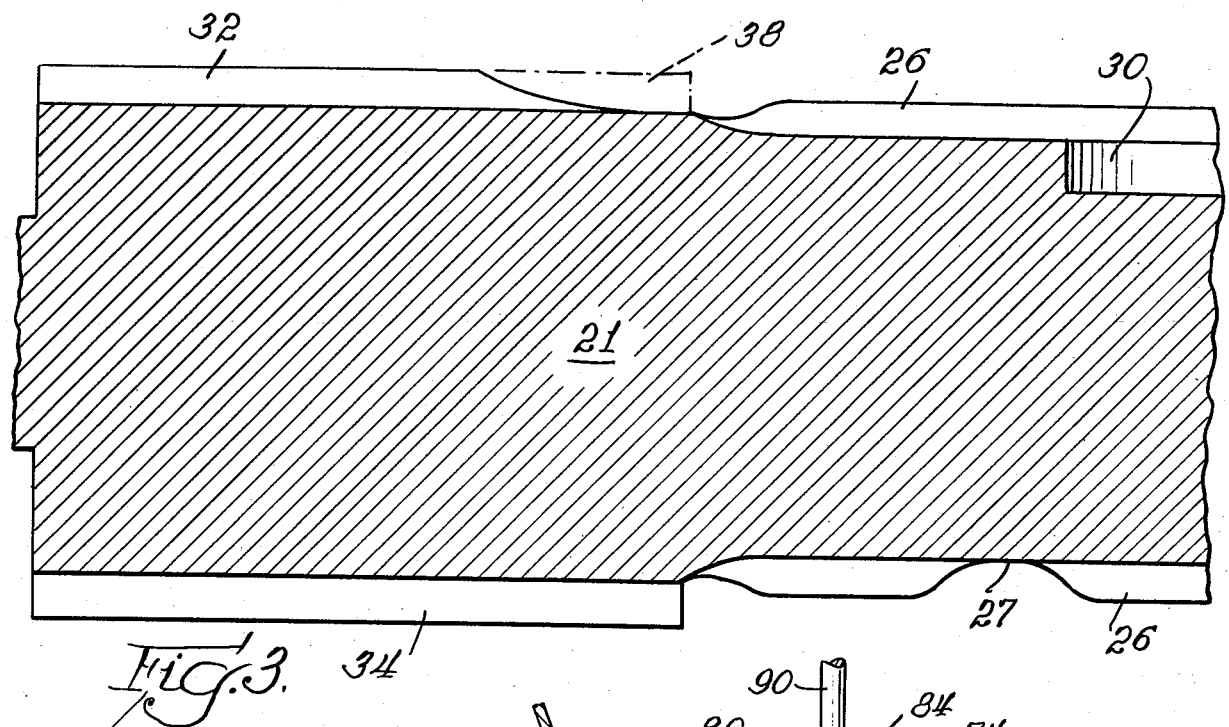
FIG. 3 is an enlarged developed cross-sectional view of one in-feed roller taken along the center line of a spiral drive spline provided on the roller.
Figure 6:
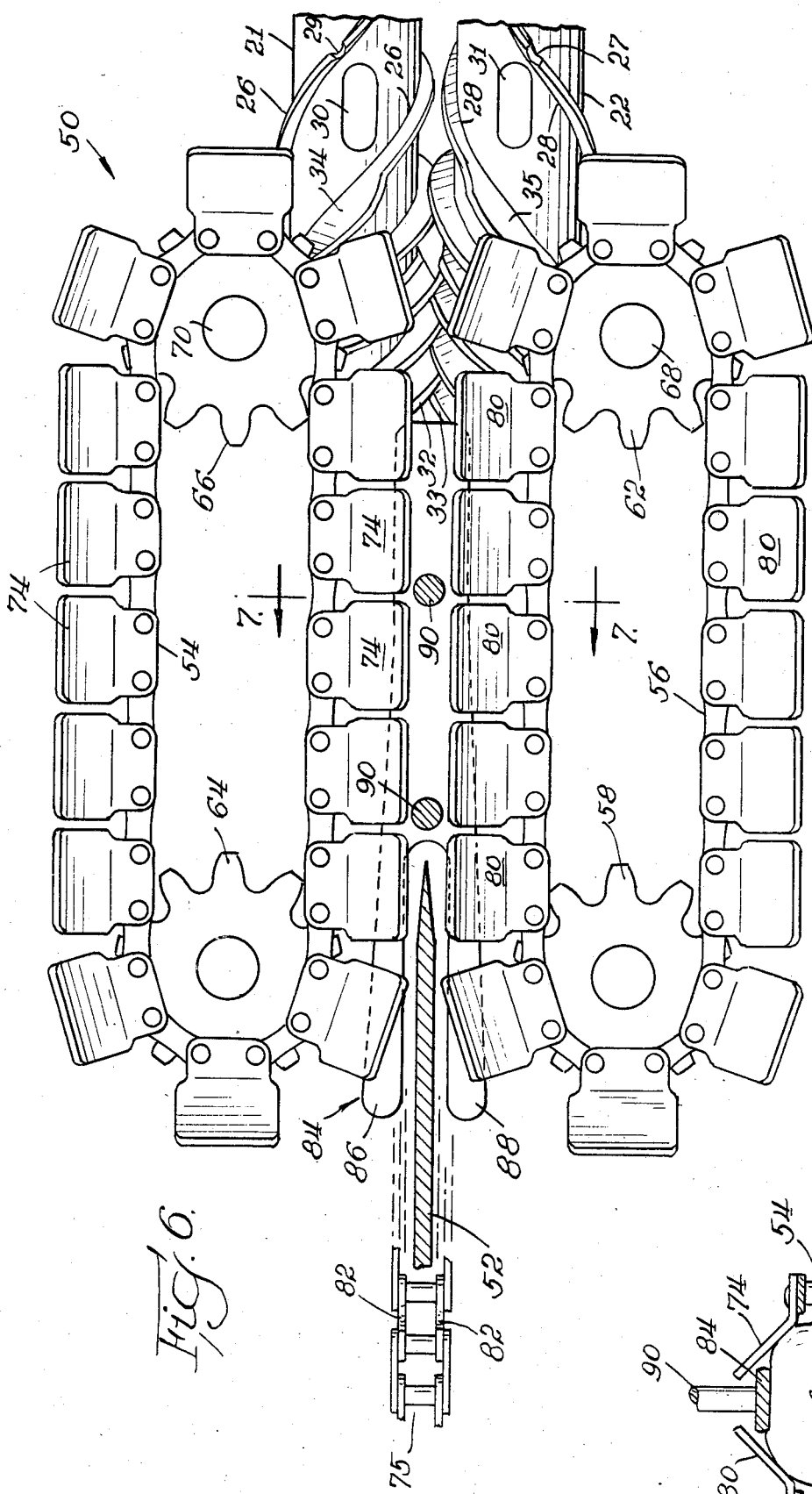
FIG. 6 is an enlarged top view of the securing and transport side chains, and its position with regard to the foremost shearing splines of the in-feed rollers, and the aft cutting blade.

Rollers 21, 22 also include spaced transfers slots 30 and 31, respectively. As shown in FIG. 6, the transfer slots 30, 31 are also arranged on the periphery of the rollers 21, 22 to be in mating alignment as the rollers rotate, and are also uniformly positioned along the length of each roller 21, 22. The slots 30, 31 thereby cooperate with the scallops 27 and 29 to define openings which further enlarge the space between the rollers 21 and 22 and facilitate the feeding of the intestines I and the stomach S downwardly between the rollers. The relative size and position of the scallops and slots on each roller is illustrated schematically by the developed view of the roller 21 in FIG. 3. In FIG. 3, the enlarged in-feed roller 21 is sectioned along the center line of a spiral transfer spline 26, to illustrate the configuration of the scallops 27 and the slots 30.

Despite the fact that the in-feed rollers 21 and 22 have been structured to provide orientation of the composite gizzards G, there remains a certain percentage of gizzards, albeit a small percentage, which, because of their size, texture, abnormality or other unknown phenomenon, are not oriented before reaching the gizzard slicing station. Of course, this anomoly decreases the yield and necessitates either the intervention of manual labor or it results in an increase in waste gizzards.

In accordance with one aspect of the present invention there is provided means for briefly retarding the movement of the gizzards as they are urged downstream along the length of the in-feed rollers 21, 22. With reference to FIG. 1 there is shown a first gizzard retarding lever arm 40 upstream from another retarding lever arm 42, each being biased against movement by the gizzard bodies advancing downstream. Forked retarding arm 40 is shown in its rest position before coming into contact with a gizzard, and retarding arm 42 is shown impeding the movement of another gizzard.

Retarding arm 40 is journaled at 45 and is biased against rotational arm movement in the downstream direction by a weight 43 which works under the influence of gravity to maintain the arm biased in the upstream direction. A pin 44 mounted to the harvester frame restricts the downward travel of the weight 43 and thus prevents the arm 40 from being pivoted upwardly out of the path of advancing gizzards.

Another manner in which the retarding arm can be biased is shown in connection with the structure of lever arm 42. FIGS. 1 and 2 illustrate a tension spring 46 as the means for biasing the retarding arm 42 in the upstream direction. The spring is anchored at one end to a stationary pin 47 and at the other end thereof to lever arm 48. Lever arm 48 is solidly connected by a transverse rod 49 to the forked retarding arm 42. The transverse rod is journaled to rotational movement in bearing 50, as shown in FIG. 2. Again, a restriction pin 51 abuts the lever arm 48, and prevents the retarding arm from overrotating in the upstream direction.

FIG. 2 further shows that the retarding arm 42 is forked to intercept the gizzard body G, whether or not such body is centered between the rollers. Also, the retarding arm is forked to intercept the gizzard body G and retard its movement, but allow the intestines I and stomach S to advance beyond the forked arm until they are drawn down between the in-feed rollers. This action prevents both the gizzards and appendages from riding on top of the rollers 21, 22 and not becoming oriented. Thus, the primary aim of this arrangement is to retard the movement of composite gizzards momentarily such that the probability of a nonstandard or abnormal gizzard being properly oriented is increased. For instance, on occasions the attached intestines and/or stomach of a gizzard may be resting on top of the gizzard body in which case its appendages may proceed to the slitting station without having been severed from the attached intestine of the stomach. This is highly objectional for two reasons. First, its appendages will require manual labor to remove the composite gizzard and reprocess it, and secondly, if not caught in time the gizzard will be split along the wrong axis and thereby prevent it from being spread and cleaned efficiently. The gizzard will surely be contaminated if the slitting means cuts through either the attached intestine or stomach.

These aspects are overcome, or at least decreased to a large extent, by the provision of these retarding arms which permit the rotational movement of the in-feed roller splines 26 and 28 to jostle the composite gizzard while it is held in a stationary position onthe rollers for a brief period of time. Because the downstream movement of the composite gizzards are briefly retarded, they are exposed to the in-feed rollers 21, 22 for a longer period of time. This retarding aspect has the effect of lengthening the rollers in a manner which is an economic expedient over actually extending the length. In the preferred embodiment the in-feed rollers are only about twelve inches long and, together with the retarding arms, significantly increase the the number of gizzards which are oriented close to ninety percent.

The down-stream retarding arm 42 serves also to space the oriented composite gizzards apart as they are passed to the next processing station where the gizzards are severed from the intestines and stomachs. The second retarding arem 42 encountered by the advancing gizzards also serves to cause orientation of the gizzards on the rollers should the first arm 40 fail to do so.

Figure 4:
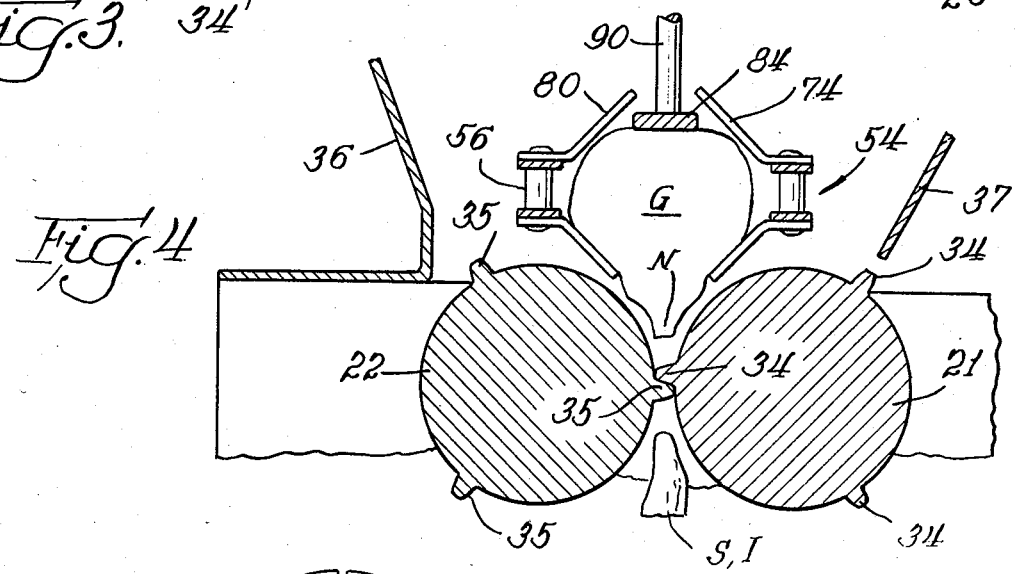
FIG. 4 is an enlarged cross-sectional elevational view of the harvester shearing station, as viewed along line 4—4 in FIG. 1, showing a gizzard as it is initially secured in the flights of the dual chain transport system, and as the stomach and intestines are being sheared by the shearing splines of the in-feed rollers.

As noted above, and as illustrated in FIG. 3, the discharge ends of the in-feed rollers 21, 22 include closely-spaced mating spiral gear teeth 32 and 33, respectively. These gear teeth function to transmit the driving force of the roller 21 to the driven roller 22. The spiral gear teeth 32, 33 also operate as a secondary or back-up shearing system for removing the stomach S and intestines I from the gizzards 20. In accordance with this invention, the primary system for shearing the stomachs S and intestines I from gizzards is by the operation of the more widely spaced spiral shearing blades 34 and 35 provided on the discharge end of rollers 21 and 22, respectively. As illustrated in FIGS. 3, 4 and 6, the spiral shearing blades 34, 35 mate together in a scissors-like relationship as the rollers 21 and 22 rotate during the in-feed and shearing operation of the harvester 10. The blades 34, 35 are formed by cutting down all or a portion 38 of the spiral gear teeth 32, 33 on the rollers 21 and 22 except for every eleventh tooth which forms the spiral blades 34, 35. In the illustrated embodiment, as noted in FIG. 3, the cutaway 38 is designed to leave three uniformly spaced shearing blades 34 on the roller 21, and three uniformly spaced and mating shearing blades 35 on the mating roller 22. In normal operation, the blades 34, 35 will perform the complete shearing operations. The closely spaced gear teeth 32, 33 come into play and perform shearing functions only if the blades 34, 35 have been broken or substantially dulled.

The shearing blades 34 and 35 are arranged to shear the stomach and intestine S, I from the gizzard G as close as practical to the body of the gizzard G. Nevertheless, because of the variations in the size of gizzards and the variance in the location of the stomachs S and I during the orientation of the gizzards in the machine, the removal of the stomach and intestines close to the gizzard may not occur as a result of the operations of the shears 34, 35. A minor residue of the tender lining, identified as the nib N in FIG. 4, usually remains on the gizzard G after the stomach S and intestines I have been sheared. In accordance with this invention, the nib N, representing the remainder of the tender lining on the gizzard, is trimmed off at a subsequent operating station in the harvester 10.

Since the spatial orientation of the gizzard G is initially obtained through the manipulation of the stomach S and intestine I as a result of the operation of the rollers 21 and 22, it is important to maintain control of the orientation of each gizzard for further processing. To that end the harvester 10 includes a system for maintaining orientation control over the gizzard body as it is directed into the slitting station 95.

Figure 5:
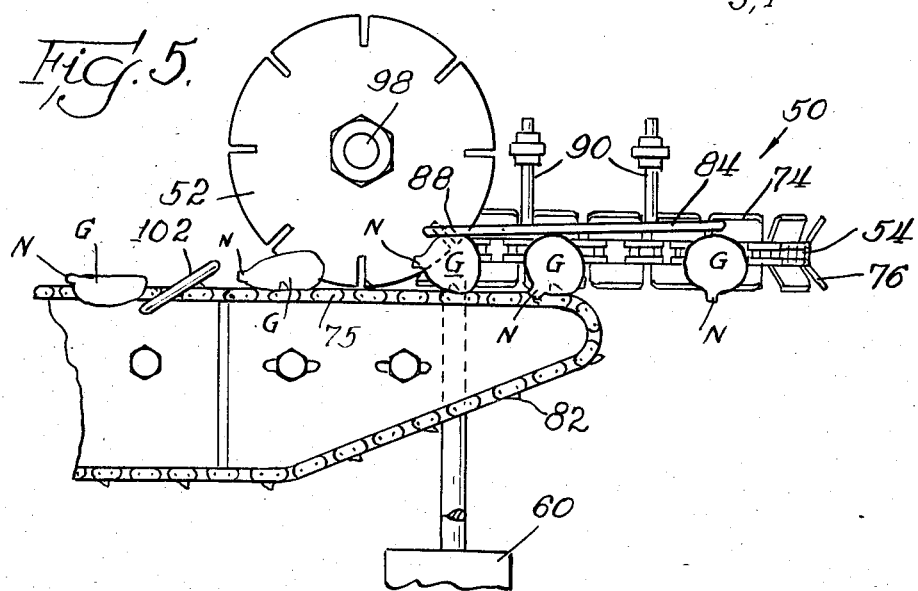
FIG. 5 is a fragmentary side view showing the arrangement between the dual transport chain, single chain transport, slanting hold-down plate and cutting blade to effect a desired rotation of the gizzard for optimum processing efficiency.

Turning now to FIGS. 5 and 6 of the drawings a gizzard body transport means is illustrated. In this processing stage of the harvester 10, a second orienting force is applied to the gizzard to ready it for subsequent processing. As will be discussed more fully below the novel construction of these chains enables the gizzard bodies to be transported, secured and reoriented in a new position. This dual chain transport means is generally designated by reference character 50 and is positioned in the harvester 10 amid the discharge end of the in-feed rollers 21, 22 and the slitting blade 52, and transports the gizzard bodies from the former to the latter. Particularly, the transport means 50 is comprised of a pair of chains 54 and 56 each positioned in the same plane and with a linked side of each disposed in an adjacent parallel relationship. The input end of the transport chains is in a superposed position above (FIG. 1) the discharge end of the in-feed rollers 21, 22 so that orientation control obtained over the gizzard bodies through the dangling intestines and stomach is not lost before subsequent control is had by the transport chains 50. It will be described in detail below the manner in which reorientation of the gizzard body is had as it is advanced downstream within the transport chains 50.

Each chain 54, 56 is driven separately by a suitable driving motor 60 (FIG. 1) through respective sprocket gears 64 and 58. Sprocket gear 64 is driven in a clockwise manner such that the linked section adjacent the linked section chain 56 is taught. Similarly, sprocket 58 is driven in a counter clockwise manner so that its inside links are taught. The adjacent inner links of each chain 54 and 56 being taught prevent lateral flexing of the chains in this section and assure that the gizzard bodies held therebetween are squeezingly secured. Chains 54 and 56 are driven at the same speed, and a gizzard secured therebetween is transported toward the slitting blade 52.

Transport chains 54 and 56 are of the roller-link type, but other types of chains and gear drives may, of course, be used.

Figure 7:
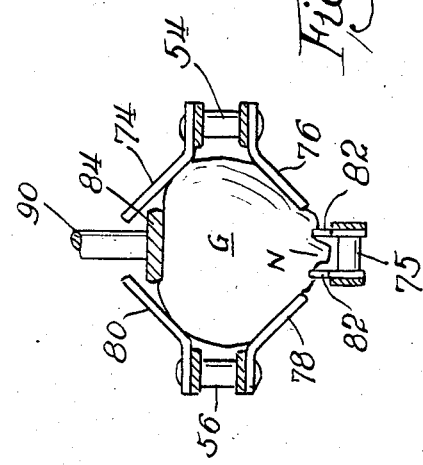
FIG. 7 is a cross-sectional view of the securing and transport side chains, taken along line 7—7 of FIG. 6, and showing a gizzard body secured between the top and bottom angled flights of each chain.

With reference to FIG. 7, in conjunction with FIG. 6, there is shown an outwardly bent top and bottom flight attached to each chain link, configured to at least partially envelope a gizzard body within a pocket-like chamber and secure it as it is advanced from the discharge end of the in-feed rollers 21 and 22. The gizzard bodies are funneled into the chain transport means and squeezingly secured therein in the same orientation as established by the in-feed rollers. In keeping with an important feature of the invention the gizzard G, either simultaneously with, or just before being detached from its appendages, is drawn into the chamber formed by those flights of chain 54 which are adjacent the flights of chain 56. With particular reference to the chain flights as shown in FIG. 7, there is illustrated the preferred form of the angular configurations of the airs of flights which enable the gizzard body G to be squeezingly confined therebetween and drawn along with the downstream movement of the chains links. The top flights 74, 80 and bottom flights 76, 78 are angled to contact a component of the top and bottom, and side surfaces of the gizzard to restrict movement of the gizzard in these directions. Significantly, this arrangement permits the secured gizzard to be rotatingly reoriented by means which will be described below.

Chain flights which are angled in the range of about 30–50 degrees have been found to provide adequate securement of the gizzard to maintain orientation center, as well as to reorient and reserve the gizzards. In the preferred embodiment top chain flight 74 is angled upwardly about 45° and the bottom chain flight 76 is angled downwardly at 45°. Chain flights 78 and 80 of chain 56 are comparably angled. Each top chain flight 74, 80 extends outwardly from its respective chain a distance sufficient to partially contact a part of the gizzard top and side surface. Each bottom chain flight 76, 78 is somewhat shorter so that the squeezed gizzard bulges out of the bottom opening, as shown in FIG. 7. In addition, the gear shafts of master transport chain 56 are spaced away from the respective gear shafts of slave chain 54 a distance such that the innermost adjacency of the chains provides a channel which squeezingly confines gizzard bodies of normal size therebetween. In this manner gizzards are secured in the positions in which they were received from the in-feed rollers 21, 22. As shown in FIG. 7 gizzard body G does not loosely fit within the chain flights, but rather is squeezed therebetween until it is somewhat distorted from its normal shape. This, of course, does no harm to the gizzard as it is a rather resilient tough organ. The chain transport system 50 receives the gizzards G from the in-feed rollers 21, 22 in a nib-down position, also as shown in FIG. 7.

It can be appreciated that as chains 54, 56 rotate about their respective sprocket gears 62 and 66 to grab a gizzard body G, a funneling effect is presented to the gizzards so as to be accepted into the channeled space between the flights of the transport chains. Each chain flight is rounded at its outer corners to prevent inadvertent scarring or tearing of the gizzard tissue. The chain flights are constructed of plastic or stainless steel to resist corrosion and provide a sanitary environment. Also, they are of sufficient width to leave only a small space between the adjacent flights of a chain and thereby provide a nearly continuous side surface.

Turning again to FIG. 1 of the drawings, the gizzard harvester 10 includes a rotating slitting blade 52 disposed in the path of gizzard bodies G advancing along the processing path. While the gizzard bodies could be transported into the splitting table in a nib-down position and cut along the top, it has been recognized that it is advantageous to reorient each gizzard to a nib-forward position so that it can be slit along another axis. It is thus preferable to reorient the oval-shaped gizzard with its longer axis disposed vertically, and then transport the gizzard body in the nib-forward position. The gizzard is then slit substantially, but not completely, across its shorter axis from above. With this slitting procedure, the connected gizzard halves can be more easily spread apart to expose the maximum internal gizzard lining and thereby enable a thorough flushing of the waste material normally contained in the gizzard.

Reorientation of gizzards is generally had, in accordance with the principles of the invention, by securing the gizzard, and engaging the secured gizzard with another means and causing movement of the engaging means with respect to the securing means. A differential speed of 20–25 percent has been found to be satisfactory in reorienting chicken gizzards in the disclosed harvester 10.

In this preferred embodiment this reorientation of the gizzard body G is achieved by utilizing a single chain transfer system 75 disposed under a portion of the dual chain transport system 50 and centered between the adjacent chain flights (FIGS. 1 and 6) for engagement with the gizzard. This single chain transfer system 75 operates in a plane substantially normal to the plane in which the dual transport chains 50 rotate. In FIG. 1 the drive chain 75 is driven in a counterclockwise direction, but at a speed greater than that of the dual chain transport system 50. Since the gizzard harvester 10 processes about seventy-five gizzards per minute, it has been found that satisfactory reorientation results are had when the dual chain transport 50 moves at about 550 inches per minute, and the single chain transport 75 moves at about 700 inches per minute. Each link of this single chain system 75 includes projections 82 which engage within the portion of the gizzard which bulges out between the bottom chain flights. While these chain projections 82 do not puncture the gizzard tissue, they do engage the gizzard tissue sufficiently such that the gizzard body tends to rotate within the angled chain flights.

The amount by which the gizzard bodies are rotated is dependent upon two factors. First, the amount of gizzard rotation is proportional to the differential speeds between the dual chain transport system 50 and the single chain system 75. Secondly, the amount of rotation is dependent on the length of that part the single chain which is disposed under the dual transport chain 50. By this it is meant that if the single chain drive system 75 were shifted to the right in FIG. 1, and with the dual chain system 50 remained stationary, the gizzard bodies would be subjected to a rotational force over a greater distance and would thus be rotated more than if the single chain system 75 remained as shown. By varying any one, or both, of these variables, virtually any orientation in a single plane of the gizzard body can be had.

It should be noted that while the dual transport chain system 50 is adapted to secure gizzards in a desired orientation, there is sufficient natural fluids and water on the gizzards bodies such that reorientation by the single chain system 75 is not prevented due to friction between the gizzards bodies and the flights of chain 56 and chain 54.

The rotational reorientational movement of the gizzards bodies enveloped in the transport chain flights, and occasioned by the projections 82 of the transfer train 75, continues until the gizzards contact the slitting blade 52. When viewed with respect to FIG. 1, the gizzards which are advanced by the dual chain transport system 50 are rotated in a clockwise direction about ninety degrees by the relative movement between the securing means 50 and the gizzard engaging transfer chain 82. The slitting blade 52 is also rotated in a clockwise direction whereupon the blade 52, in slitting a gizzard, produces a counterrotating force on the gizzard in a direction opposing the reorientation force and thereby halts further rotational movement of the gizzard.

To facilitate the reorientation of the gizzard occasioned by the transfer chain 75, the preferred embodiment of the invention includes a hold-down plate 84 as shown in the fragmentary view of FIG. 7. This hold-down plate 84, also shown in FIG. 5, is disposed in the gizzard chamber of the dual chain transport 50, slants downwardly toward the cutting blade 52 and thereby functions to compress the gizzard G downwardly against the transfer chain links 52 to facilitate the reorientation of the gizzards within this processing station. The hold-down plate 84 is partially shown in FIG. 6 with its downstream end slotted to receive the cutting blade 52. The bifurcated ends 86 and 88 serve to further compress the gizzard body downwardly as it is advanced further into the slitting blade 52. The hold-down plate 84 is supported by a pair of standards 90 which extend upwardly through the opening between the top flights 74 and 80 of the transport chains 54 and 56, and is rigidly fixed to the gizzard harvester frame (not shown). The hold-down plate 84 is preferably constructed of plastic or stainless steel metal to resist corrosion and maintain a sanitary environment.

With the foregoing background in mind, the gizzard bodies G having been reoriented to a nib-forward position, are slit by the rotary blade 52 along a desired axis, secured in this new reoriented position and presented to the next processing station.

For completeness of description, a spray head 92 is disposed in a superposed position near the shearing station to keep the transport chains 54 and 56 clean, as well as to assist in flusing the stomach and intestines into floor troughs (not shown). The spray head 92 also assists in keeping the meshing gears 32, 33 (of FIG. 6). Located at the discharge end of the feed rollers 21, 22, in a clean condition by preventing the buildup of waste on such gears.

As noted previously, the conveyor means 75 is in the form of a single transfer chain. This chain 75 is an endless chain having uniformly spaced flights or projections 82 on each chain link. A drive sprocket 96, and a suitable idler sprocket (not shown) drive the chain 75 in a counterclockwise direction.

The slitting saw blade 52 is rotatably positioned on a drive axle 98, as shown in FIG. 1. The axle 98 in the preferred embodiment is a floating axle, and is counterbalanced or spring biased to maintain the saw 52 in a selected position extending between the dual transport chains 54, 56. As shown in FIGS. 1 and 5, the saw blade 52 is also spaced a selected distance above the lower single chain 75. Thus, the saw 52 will engage with and slit the gizzards G being conveyed by the chains 54, 56 and 75 through the station 100. The floating mounting for the saw 52 will permit the saw to rise if an exceptionally large gizzard G is advanced into the saw, or if contaminants such as stones or the like, which are typically found in gizzards, are engaged by the saw during the slitting operation. As shown in FIG. 5, the gizzard G is secured in its reoriented position during the slitting operation 95 by the firm engagement of the three chains 54, 56 (not shown) and 75, the hold-down plate 84 and the blade itself 52.

After the slitting operation has been completed, the slit gizzards G are conveyed out of engagement with the dual chains 54 and 56 and into engagement with a spreader bar 102. As illustrated in FIG. 1 the spreader bar 102 is extended above the single conveyor chain 75 and functions to engage with the slit gizzard G, to fold the portions downwardly into an open position. A more fully detailed description of the structure concerning this process is set forth in the co-pending application identified in the first part of this description, the disclosure of which is incorporated herein by reference thereto. In general, the gizzards G are completely opened to expose the internal waste contents and the interior lining or membrane of the gizzards for further processing. The gizzards G, in the opened condition, are then conveyed beneath power jet spray nozzles 104 which operate to flush the stones and other contaminants from each gizzard into a flush trough below. For brevity, it is sufficient to understand that the slit, opened and cleaned gizzard bodies are yet secured and advanced downstream in the nib-forward position between a spreader bar 106 and the links of the single transfer chain 75. The cleaned and opened gizzards are now prepared for final processing.

The final processing of the gizzards G in harvester 10 occurs at the trimming and peeling station 110. In accordance with this invention, this station 110 performs the functions of trimming the residual tender lining (the nib) from the gizzards G, and then peeling the interior lining or membrane from the gizzards. The gizzards are hence prepared for consumption, or for still further processing by other machines. In the illustrative embodiment, these trimming and peeling functions are performed at the station 110 first by a primary pair of parallel side-by-side trimming and peeler rollers 120, and then by a secondary pair of parallel side-by-side rollers 122.

The trimming and peeling station 110 is illustrated in detail in FIGS. 8, 9 and 10. The primary pair of rollers 120 includes roller 124 counterrotating in cooperation with roller 126. The secondary pair of rollers 122 is downstream from the primary roller pair 120 and includes roller 128 counterrotating in cooperation with roller 130.

In the illustrated embodiment, a first area or section of the peeler rollers 124 is provided with a pair of diametrically disposed spiral shearing splines 132, also shown in FIG. 8. Further, the corresponding area of the cooperating peeler roller 138 includes diametric spiral shearing splines 134. As shown in FIGS. 8 and 9, the splines 132 and 134 engage in a scissor-like manner, and are adapted to shear the nib portion N of the tender lining which is yet attached to the gizzard G. A second area or section of the primary peeler roller 124 includes spiral peeler splines 136, as illustrated in FIG. 8. The corresponding area of the other peeler roller 126 includes similar spiraled peeler splines 138 which intermesh with and drive roller 124 via its splines 136. These sections of the peeler rollers 124, 126 are designed to engage with the interior membrane of the gizzard G, (but not the gizzard meat itself) to peel the membrane from the gizzard and discharge the membrane into a flush trough below. In the illustrated embodiment the shearing splines 132, 134 are spaced apart for grabbing the nib by reducing the height of the peeling splines 124, 126 amd are located in the area of the rollers in alignment with the conveyor chain 75. The shearing splines 132, 134 intermesh in a manner similar to the peeling splines and define the scissor-like shearing blades for trimming the nib N from the gizzard G. For purposes of clarity, the full complement of half-height splines in the shearing area of rollers 120 are not shown in FIG. 8.

In order that the shears 132, 134 perform their trimming function efficiently, the gizzards G should be presented to the primary rollers 124, 126 in a preselected orientation. Efficient trimming is obtained if, as shown in FIG. 9, the gizzard G is presented in an edgewise fashion so that the portion of the gizzard to which the stomach and intestines had been attached, including the nib N, is initially presented to the peeling and shearing station 110 between the rollers 124, 126. The reorientation of the nib N in this position occured as a result of the differential speed difference between the dual transport chain 50 and the single transfer chain 75. Additionally control over the nib-forward position of the gizzard G has been maintained up to this point in the harvesting process. As previously provided in the gizzard harvester 10, the gizzard bodies G were rotated to a nib-forward position and maintained in this position for introduction between rollers 124, 126, as shown in FIG. 8.

Process station 110 includes a pair of fluid jets 140, (FIG. 9) to assist in maintaining the nib-forward orientation of the pair of gizzard G. The jets 140 are in alignment with the transfer chain 75, and direct a spray of water or other suitable fluid directly at the gizzard G to remove them from the transfer chain 75, and to direct them into the roller pair 120. Since the shearing section of rollers 124, 126 is positioned below the return bend in the chain 75, the gizzards G are presented in a nib-forward position downwardly into the valley between the rollers 124 and 126. The shearing section of the rollers is about 3½ to 4½ inches in length, with the overall length of the roller section being 10¼ inches. The fluid jets 140 also assist in maintaining the gizzards G in the nib-down position during the trimming operation. Further, station 110 includes a divider baffle 142 which separates the processing area of the primary rollers 120 from the processing area of the secondary rollers 122. It has been found that the presentation of the gizzards G to the rollers 124, 126 in this nib-down fashion, assures that a very high percent of tender lining nibs N will be trimmed by the shearing blades 132, 134. The success of the peeling process is related to the trimming process as once the shearing splines 132, 134 engage the nib, the inner membrane is also engaged and thus the peeling process starts.

A detailed description of the construciton of the primary roller pair 120 may be had by reference to the parent application identified above where the corresponding rollers are identified as "peeler rolls".

After trimming is completed in the shearing area of the primary roller pair 120, the primary rollers 124 and 126 operate to pull the gizzard G downwardly against the spiral peeler teeth 136 and 138, and to simultaneously transport the gizzards downstream along the rollers in the peeler area. The advancement of the trimmed gizzards is aided by water (FIG. 8) from a set of water jets 144 directed downstream on the primary roller pair 120. These jets 144 also prevent a pile-up of gizzards on the rollers in the event they are stalled too long before becoming engaged with the roller splines. The ridges or crowns of the spiral splines travel at about five inches per second and with 75 gizzards per minute arriving they must be trimmed and quickly moved along. The interior membrane of the gizzard G is the completely removed by the peeler splines 136 and 138, and discharged into a flush trough below.

Illustrated in FIG. 8, in partial phantom form, is a double slotted cover plate 146 which covers both primary and secondary roller pairs 120, 122 except for the area immediately above the rollers of each pair where the splines become adjacent. One slotted opening is shown at 148 where the upper roller surfaces of rollers 128 and 130 contact the gizzard bodies. On the right hand end of secondary roller pair 122 the slot 148 narrows to a slit 150 to further restrict the exposure of the rollers 128, 130 to gizzards, as the harvesting process here is complete and further full engagement of the rollers with the gizzards would result in the gizzard meat itself being removed. The cover plate 146 covering the primary set of rollers 124, 126 is comparably slotted with the narrow slit being at the left hand end of the rollers (see also FIGS. 9 and 10). The ends of the shearer and peeler rollers under the narrow slits 150 and 156 includes a one inch section of shearer splines, similar to the splines on the opposite ends of the rollers. This one inch shearer spline section permits detached nibs to be drawn down into the rollers and discarder rather than being carried over to the secondary roller set from the primary set, or carried out of the peeler section exit.

Finally, the trimmed and peeled gizzard body G is engaged by a rotary and flexible knocker 152, which propels the gizzard bodies randomly from the primary roller pair 120 downstream onto the secondary roller pair 122. A retainer shield 154, shown in phantom in FIG. 8, catches the propelled gizzards and confines them to the secondary roller set 122 area. FIG. 10 is a cross-sectional view taken along line 10—10 of FIG. 8, illustrating the narrow slit 156 in the cover plate 146 on the left hand side of the primary roller set 120. This narrow slit allows the gizzard bodies to be pushed onto the cover plate and out of contact with the primary rollers 124, 126 and thus prevent undue damage to the gizzard meat.

One roller 126 of the primary roller set 120 is provided with a sprocket drive gear 158 which is chain driven from another sprocket gear 160 keyed to a drive shaft 162. Both primary 120 and secondary 122 roller pairs are journaled for free rotation within bearings (not shown) mounted in the bearing support blocks 164 and 166. Each peeler roller is provided with a total of eighteen peeler splines which drive, or are driven, as the case may be, by the splines of its cooperating peeler roller.

The drive roller 126 of the primary roller set 120 is also drivingly connected to roller 130 of the secondary roller pair 122. Particularly, primary drive roller 126 is provided with a shaft extension 170 on which a sprocket gear 171 is keyed, and connected by a drive chain 172 to another sprocket gear 174 which is keyed to the shaft 176 of the secondary drive roller 130. Significantly, the diameter of sprocket gear 174 is larger than that of gear 171 which has the result of rotating the rollers of the secondary set 122 slower than those of primary set 120. In the preferred embodiment, the rollers of the primary set 120 rotate at approximately 420 rpm, whereas the rollers of the secondary set 122 rotate at about 315 rpm—a 25% reduction in speed.

In furtherence of an important feature of the present invention the provision of the secondary roller set 122 has demonstrated a yield increase of about 5–15%. The primary function of the secondary roller set 122 is to remove any gizzard appendages, in the nature of nibs or linings which were missed in the previous processing stage, as well as fatty tissue on the outer surface of the gizzard. The input end of the secondary roller set 122 is provided with an area of spiral shearing splines 180 similar in construction to those of the primary roller set 132 and 134. In the event the nib tissue of a gizzard body G is not cut, or not cut closely enough to the gizzard body in primary roller set, the shearing splines 180 and 182 of the secondary roller set 122 provide a back-up for increasing the probability that such a nib will be correctly removed. These probabilities are also increased insofar as orientation and control of gizzards on the secondary roller set 122 is lost. Therefore, the random tumbling of an unsatisfactorily processed gizzard increases the chances that the nib portion will eventually be caught within the splines 180 and 182 of this slower rotating roller set 122. The spiral splines of the second set aid the slit gizzards in advancing downstream (to the right in FIG. 8) on the peeler splines 184 and 186.

In accordance with the invention there is provided a vibrating tamper block 190 which functions to compress the tumbling gizzards onto the rotating peeling splines 184 and 186. The random tumbling action of the gizzard bodies, along with the pressure applied to such gizzards from the tamper plate 190 assures that any fatty tissue that is on the exterior surface of the gizzard bodies is removed. Another water jet 192 (FIG. 9) facilitates washing the waste fat through the rollers 128, 130 and into a drainage trough below.

The pressure applied on the gizzards by the tamper plate 190 is, in part, a result of the weight of the tamper plate structure. The tamper plate 190 is not forced through a complete oscillatory stroke, but rather yields when over-sized gizzards or piled gizzards accummulate under the tamper plate 190. The tamper plate 190 is yieldingly movable as it is cammed to a lobe in a non-rigid fashion.

The tamper plate 190 is fixed at one end of a lever arm 194 the other end of which is pivotally mounted to a frame member 196 by pin 198. With this construction the tamper plate 190 is free to move in a vertical plane about pivot pin 198. A transverse connecting arm 200 connects the lever arm 194 to the cam mechanism 202 which rides freely on a cam lobe 204 which, in turn, is fixed to the drive shaft 162, the power source to the peeling station 110. The cam roller mechanism 202 is disposed in a depending fashion by a threaded rod 206 from the transverse connecting arm 200 such that the arm 200 and thus the tamper plate 190 can be adjusted upwardly or downwardly to a desired tamping position.

Cam roller 208 is journaled for rotation in a clevis 210 which is attached to the threaded rod 206.

In the preferred embodiment a single cam lobe 204 provides an oscillatory tamping motion of about 210 cycles a minute. Depending on the rotational velocity of the peeling station drive shaft 62, additional lobes may be provided to increase the vibratory action of the tamper plate 190. Also, changes in the height of the cam lobe 204 may be desired to increase or decrease the vibrating stroke of the tamper plate 190. According to the preferred embodiment, the cam lobe 204 is constructed to cause the tamper plate 190 to undergo a vertical stroke of about one inch. This permits sufficient clearance below the plate when it is in the up-stroke to permit the passage of gizzards therebelow.

Because the anchor end of the connecting arm 194 is bifurcated to closely fit around the frame member 196 the lateral movement of the tamper plate is restricted thereby maintaining a correct alignment of the cam roller 208 over the lobe 204. By varying the weight of the tamper mechanism various tamping pressures may be exerted on the gizzards. In the alternative, a tension spring 212 may be connected between the lever arm 194 and the frame member 196 to increase the tamping pressure as well as maintain the cam roller 208 biased against the lobe 204. This bias arrangement assures that the cam roller 208 will follow the lobe curvature, even at high drive shaft 162 speeds. A spring having an eighteen pound tension has been found to satisfactorily bias the roller against the cam lobe.

On the up stroke of the tamping plate 190 the randomly-arranged gizzards are advanced downstream toward the exit end of the secondary roller pair 122, whereupon the gizzards are discharged from the harvester 10. Significantly, processed gizzards are discharged from the peeling station 110 without the aid of knocker mechanism, or other apparatus for expelling the gizzards from the machine. The feature is achieved by arranging the secondary drive roller 130 axially downwardly with respect to the associated roller 128, as shown in FIGS. 9 and 10. With this positional arrangement gizzards are pushed on the cover plate 146 near the narrow slit 150. Because roller 130 is axially angled at about twenty degrees with respect to the axial axis of roller 128, gravity acts upon the processed gizzards at the discharge and of roller pair 122 and accordingly they slide down the cover plate exit end. Of course, water jets, or the like, could be used to aid in discharging the processed gizzards from the harvester 10.

In view of the above description of the illustrated embodiment of the harvester 10, the features and advantages of the apparatus and process of the present invention will be understood by describing the operation of the harvester in a typical poultry gizzards processing assembly line. In this assembly line, operators will be stationed adjacent hopper 16 to transfer the gizzards from a chicken or other poultry carcass into the harvester 10. Preferably, one operator is positioned at each end of the hopper 16 so that two operators are loading gizzards including attached stomachs and intestines into each inclined end of the hopper 16 in a random arrangement. The gizzards and appendages are directed by gravity down inclined bottom walls 18 and the chute 19, into the feeding and alignment station 20.

In station 20, each gizzard G is directed into engagement with the rotating surfaces of the in-feed rollers 21, 22. The spiral feeding splines 26, 28 on the rollers, which are counterrotating toward each other, feed the stomach S and the intestine I of each gizzard G downwardly between the rollers into a position such as shown in FIG. 2. The recessed scallops 27, 29 on the splines, and the recessed slots 30 and 31 on the rollers 21 and 22, assist in feeding the stomach S and the intestines I between the rollers. The in-feed roller 21 and 22 thereby apply an initial orienting force to each gizzard G as it is discharged from the chute 19. This initial orienting force includes a downward component which holds the gizzard G against the surface of the rollers 21 and 22 in a generally central orientation, such as illustrated in FIG. 2. Furthermore, the spiral configuration of the splines 26, 28 add a downstream motional component to this initial orienting force which functions to transport the gizzard G along a predetermined path between the roller 21 and 22. Thus, the attached portions of the gizzard G including the stomach and the intestines are utilized to apply initial orienting and transporting force components to each gizzard G.

As station 20 continue to operate, the gizzards G are transported downstream until they are momentarily retarded and caused to be stalled on the infeed rollers until it is assured that the gizzard appendages are pulled downwardly into the rollers. The last retarding arm disposed in this processing path serves also to space the gizzards apart in a uniform pattern. In this station the gizzards are oriented in an upright position with the stomach and intestines dangling below. When this initial orientation has been established by either of the retarding arms placed in the advancement path over the in-feed rollers, the gizzards are transported into the grasp of a pair of side-by-side transport chains. These chains are provided with angled flights which, when the chains rotate together, form a chamber into which the gizzards are squeezingly confined and carried downstream. Before being pulled off the discharge end of the in-feed rollers, the intestines and stomach appendage are severed from the gizzard by shearing splines on the in-feed rollers.

Next, the dual transport chains transfer the gizzards without the stomach and the intestines, toward a slitting and spreading station, but not before they are reoriented to a new position more advantageous for subsequent processing. A single transfer chain, operating paralles and under the dual transport chain, comes into contact with the underside of the gizzard bodies and rotates them to a nib-forward position. This is accomplished by running the single transfer chain at a speed faster than the dual transport chain. Upon coming into contact with the rotating blade, the gizzards stop rotating and are cut open along a desired axis. The support rail and the spreader bar cooperate to maintain the gizzard in the proper nib-forward orientation as received from the slitting operation. Furthermore, the spreader bar also secures the split gizzards on the single transfer chain. As the gizzards are conveyed from the saw, they engage with the spreader bar members, to be spread open for flushing. The flush nozzle then operates to cleanse each gizzards as it is conveyed by the chain to the trimming and peeling station.

At the peeling and trimming station, the gizzards are directed around the return bend of the single transfer chain so that they are presented in a generally nib-forward position to the primary shearer-peeler rollers. The shearing splines on these rollers then trim the nibs N from the gizzards. The fluid jets aligned with the single transfer chain assist in maintaining the gizzards G in the proper orientation during this trimming operation. The free gizzard G is then drawn downstream by the operation of the roller splines so that the interior lining or membrane of the gizzard comes into contact with the peeler splines on the primary rollers. The interior membrane is thereby peeled away from the gizzard as it is transported further downstream along the primary roller set. The trimmed, peeled and cleaned gizzard is engaged by the knocker and directed in a random disoriented manner into the shearing spline section of the slower rotating secondary shearer-peeler roller set where the remaining residual or misprocessed nibs are removed. The splines on this roller set urge the tumbling gizzards onto the peeler splines where they are compressed by a vibrating tamper. This functions to remove any residual inner membrane, or fat normally attached to the outside surface of the gizzard. The gizzard processing is thus completed.

Because of the addition of the retarding means functioning in cooperation with the in-feed rollers, the dual transport chain working in conjunction with the single transfer chain to reorient the gizzards, and the secondary shearer-peeler rollers and tamper device, the gizzard harvester achieves a processed gizzard yield well in the nitety percent range, without a sacrifice in the through-put of the machine.

Although the invention has been described above with a certain degree of particularity with respect to the apparatus and the method for processing poultry gizzards, it should be understood that this disclosure has been made only by the way of example. Consequently, numerous changes in the details of construction and in the combination and arrangement of the components, as well as in the possible modes of utilization and methods of operation, will be apparent to those familiar with the art and may be resorted to without departing from the scope of the invention as claimed.

What is claimed is:

1. In a poultry gizzard harvesting apparatus of the type having a pair of side-by-side linked transport chains for gripping a gizzard therebetween and transporting said gizzard in a desired direction, the improvement in said transport chains comprising means defining elongated chamber means with concave side wall means sized for engaging at least a portion of the top and bottom surfaces of the gizzard to confine it therebetween, and for engaging at least a portion of the opposing sides of said gizzard to confine it therebetween, said elongated chamber means defining an open-ended passageway to orient the gizzard lengthwise generally parallel to the elongated dimensions of said chamber means, and gizzard reorienting means for engaging a gizzard while in said chamber means, said reorienting means being movable in a direction generally parallel to that of said transport chains to rotate said gizzard to a different reorientation.

2. In a poultry gizzard processing apparatus of the type having means for transporting a gizzard in a secured position from one location to another location, the improvement comprising:

chain means with a first linked section parallel to and spaced apart from a second linked section for confiningly receiving a gizzard therebetween;

means for moving the links of said first and second linked sections in the same direction from said one location to said another location;

means attached to said chain means defining elongated chamber means with concave side wall means sized for contacting a portion of the top and bottom surface of said gizzard thereby restricting gizzard movement therebetween, and for contacting a portion of the opposing sides of said gizzard thereby restricting gizzard movement therebetween, said elongated chamber means defining an open-ended passageway to orient the gizzard lengthwise generally parallel to the elongated dimensions of said chamber means, and gizzard reorienting means for engaging a gizzard while in said chamber means, said reorienting means being movable in a direction generally parallel to that of said chain means to rotate said gizzard to a different reorientation.

3. The improved gizzard transport means of claim 2 wherein said means for contacting a portion of the gizzard comrises;
  chain flight means articulated with the links of said first and second linked sections, the flight means of said first linked section including means for contacting both a top and first side surface component of the gizzard and both a bottom and side surface component of the gizzard, and the flight means of said second linked section including means for contacting both a top and opposing side surface component of the gizzard and both a bottom and opposing side surface component of the gizzard.

4. The improved gizzard transport means of claim 3 wherein the flight means of said first linked section are angled toward said second linked section, and vice versa, whereby the flight means of said first and second linked sections, define a chamber at least partially enveloping and securing a gizzard therein.

5. In a poultry gizzard processing apparatus of the type having means for transporting a gizzard in a secured position from one location to another location, the improvement comprising:
  chain means with a first linked section parallel to and spaced apart from a second linked section for confiningly receiving a gizzard therebetween;
  means for moving the links of said first and second linked sections in the same direction from one location to another location;
  chain flight means articulated with the links of said first and second linked sections, the flight means of said first linked section including means for contacting both a top and first side surface component of the gizzard and both a bottom and side surface component of the gizzard, the flight means of said second linked section including means for contacting both a top and opposing side surface component of the gizzard and both a bottom and opposing side surface component of the gizzard, the flight means of said first linked section being spaced apart from the flight means of the second linked section defining a slotted clearance; and
  said gizzard transport means further including gizzard reorienting means comprising engaging means disposed in said slotted clearance for engaging a gizzard secured within the chain flight means of said first and second linked sections, said engaging means being movable in a direction parallel to that of said linked sections and with a speed different than that of said linked sections, whereby said gizzard is rotated to a different reorientation.

6. The improved gizzard transport and reorienting means of claim 5 wherein said engaging means moves in the same direction as said linked sections.

7. The improved gizzard transport and reorienting means of claim 6 wherein said engaging means moves faster than said chain means.

8. The improved gizzard transport and reorienting means of claim 5 further including slitting means desposed in the transport path of the gizzards secured in said transport means, said slitting means being moved in a direction opposing the reorientation of said gizzard by said engaging means, whereby the gizzard reorientation is stopped.

9. The improved gizzard transport and reorienting means of claim 5 further including in combination means for orienting gizzards through the use of attached appendage organs to an initial position, and for transferring the initially oriented gizzards for securement in said transport means, whereby gizzards can be reoriented to new position and cut through a desired axis.

10. The improved gizzard transport and reorienting means of claim 9 wherein said gizzards are reoriented to a nib-forward position and the slit.

11. In a poultry gizzard processing apparatus of the type having means for transporting gizzards in a secured position from a first location to a second location, the improvement comprising:
  transport medium means movable from said first location to said second location;
  means attached to said transport medium means, and including a first and second element movable toward each other, for forming an elongated chamber with concave side wall means to receive a gizzard therein, and for confining the movement of said gizzard therein in a direction transverse to the movement of said transport medium means, said elongated chamber means defining an open-ended passageway to orient the gizzard lengthwise generally parallel to the elongated dimensions of said chamber means, and gizzard reorienting means for engaging a gizzard while in said chamber means, said reorienting means being movable in a direction generally parallel to that of said transport medium means to rotate said gizzard to a different reorientation.

12. The improved gizzard transport medium of claim 11 further including means for moving said first and second elements together so as to squeezingly confine said gizzard therebetween and restrict the movement of said gizzard in a direction aligned with the movement of said transport medium means.

13. The improved gizzard transport medium of claim 11 further including:
  means for squeezingly confining the movement of said gizzard in said first and second elements;
  and wherein said first and said second element includes a spaced-apart portion whereby a portion of said gizzard protrudes therethrough due to said squeezing confinement.

14. The improved gizzard transport means of claim 11 further including a plurality of said first elements and a corresponding plurality of said second elements.

15. The improved gizzard transport means of claim 11 further including presser means disposed within said chamber, and angled downwardly in a downstream direction, and wherein said transport medium means moves with respect to said presser means such that said gizzards are squeezed between said presser plate and said means attached to said transport medium.

16. The improved gizzard transport means of claim 15 wherein said presser means comprises a hold-down plate fixed with respect to said transport medium means.

17. In the apparatus of claim 11 wherein said reorienting means moves with a speed different than that of said transport medium means.

18. In the apparatus of claim 1 wherein said reorienting means moves with a speed different than that of said transport chains.

19. In the apparatus of claim 2 wherein said reorienting means moves with a speed different than that of said chain means.

* * * * *